(12) United States Patent
Kasemsuwan et al.

(10) Patent No.: US 11,737,483 B2
(45) Date of Patent: Aug. 29, 2023

(54) CALCIUM ENRICHED SEAFOOD PRODUCT

(71) Applicant: THAI UNION GROUP PUBLIC COMPANY LIMITED, Samutsakorn (TH)

(72) Inventors: Tunyawat Kasemsuwan, Bangkok (TH); Supaporn Boontiang, Bangkok (TH)

(73) Assignee: Thai Union Group Public Company Limited, Samutsakom (TH)

( * ) Notice: Subject to any disclaimer, the term of this patent is extended or adjusted under 35 U.S.C. 154(b) by 0 days.

(21) Appl. No.: 16/070,240

(22) PCT Filed: Jan. 26, 2016

(86) PCT No.: PCT/TH2016/000005
§ 371 (c)(1),
(2) Date: Jul. 13, 2018

(87) PCT Pub. No.: WO2017/131591
PCT Pub. Date: Aug. 3, 2017

(65) Prior Publication Data
US 2019/0230964 A1    Aug. 1, 2019

(51) Int. Cl.
| A23L 17/00 | (2016.01) |
| A23L 13/40 | (2023.01) |
| A23L 17/10 | (2016.01) |
| A23L 13/00 | (2016.01) |
| A23L 13/10 | (2016.01) |

(52) U.S. Cl.
CPC .............. *A23L 13/432* (2016.08); *A23L 13/06* (2016.08); *A23L 13/10* (2016.08); *A23L 17/00* (2016.08); *A23L 17/10* (2016.08); *A23V 2002/00* (2013.01)

(58) Field of Classification Search
CPC ......... A23B 4/14; A23L 1/325; A23L 13/432; A23L 13/06; A23L 13/10; A23L 33/16; A23L 33/10; A23L 17/00; A23L 17/10; A23V 2250/156; A23V 2250/1578; A23J 1/10; A23J 1/04; A23J 1/002
See application file for complete search history.

(56) References Cited

U.S. PATENT DOCUMENTS

| 2,064,872 | A | * | 12/1936 | Ash | A23B 4/0056 |
| | | | | | 426/325 |
| 4,363,820 | A | * | 12/1982 | Ernster | A23B 4/20 |
| | | | | | 426/257 |
| 2015/0010481 | A1 | * | 1/2015 | Fujita | A61K 8/37 |
| | | | | | 424/57 |
| 2016/0058059 | A1 | * | 3/2016 | Park | A23L 17/10 |
| | | | | | 426/643 |

FOREIGN PATENT DOCUMENTS

| EP | 416782 A1 | * | 3/1991 | ............. A23L 1/325 |
| JP | 60-259163 A | | 12/1985 | |
| JP | 4-190768 A | | 7/1992 | |
| JP | 08051960 A | * | 2/1996 | ............. A23L 1/325 |
| JP | 2011193729 A | * | 10/2001 | |
| JP | 2002238504 A | * | 8/2002 | ............. A23L 1/325 |
| JP | 2003-225070 A | | 8/2003 | |

OTHER PUBLICATIONS

Soottawat Benjakul & Sulaiman Mad-Ali, & Pornsatit Sookchoo, Characteristics of Biocalcium Powders from Pre-Cooked Tongol (*Thunnus tonggol*) andYellowfin (*Thunnus albacores*) Tuna Bones, Food Biophysics (2017) 12:412-421, Accepted: Aug. 11, 2017/ Published online: Aug. 18, 2017.*
JP 08051960 A, Yohsioka et al.m Machine Translation, English. (Year: 1996).*
JP 2002238504 A, Masakatsu et al., Machine Translation, English. (Year: 2002).*
Advances in Food and Nutrition Research vol. 65, Marine Medicinal Foods: Implications and Applications—Animals and Microbes, pp. 506, (Year: 2012).*
Mintel GNPD, "Tuna Chunks in Soy Oil," Nutrition Facts, URL= http://www.gnpd.com, 2015, 4 pages.
International Search Report, dated Aug. 23, 2016, for International Application No. PCT/TH2016/000005, 2 pages.
Yin et al., "Effects of nano-scaled fish bone on the gelation properties of Alaska pollock surimi," *Food Chemistry* 150:463-468, 2014.
Hartnett, "Dockside: New Products on the Horizon in Seafood Freezer Cases," *Frozen Food Age*, Jan. 2008, pp. 20.

* cited by examiner

*Primary Examiner* — Hong T Yoo
(74) *Attorney, Agent, or Firm* — Seed IP Law Group LLP

(57) ABSTRACT

A calcium enriched seafood product according to this invention, which includes, but not limited to, a shelf stable, chilled and frozen tuna or salmon products or other similar shelf stable, can provide a considerable bone health benefit to consumers by providing as much as 412 mg/100 g of available calcium in the finished product. This disclosure comprising the additional calcium supplement wherein the amount of calcium in final product is in the range of 0.5 to 5.0% (w/w) of the total weight of said product and wherein the sources of additional calcium supplement can be selected from raw or partially purified animal or fish bone or partially purified fish bone or inorganic calcium compound.

18 Claims, 3 Drawing Sheets

|  | Control | Treatment 1 with tuna bone powder 1.5%w/w | Treatment 2 with tuna bone powder 1.7%w/w | Treatment 3 with Di-calcium phosphate 1.7%w/w |
| --- | --- | --- | --- | --- |
| Fill weight (g) | 89.0-80.1 | 80 | 81 | 80 |
| Drain weight (g) | 78.8-80.4 | 85.3 | 87.1 | 85.8 |
| Weight difference (%) | (-1.5)-(+0.3) | + 6.6 | + 7.5 | + 7.3 |

FIG. 1

|  | Control | Treatment 1 with tuna bone powder 1.5%w/w | Treatment 2 with tuna bone powder 1.7%w/w | Treatment 3 with Di-calcium phosphate 1.7%w/w |
| --- | --- | --- | --- | --- |
| Sensory quality | Typical tuna flake in brine texture | Texture of tuna flake have more moist and firm comparing to control | Texture of tuna flake have more moist and firm comparing to control | Texture of tuna flake have more moist and firm comparing to control |

FIG. 2

|  | Control | Treatment 2 with tuna bone powder 1.7%w/w |
|---|---|---|
| Fill weight (g) | 82 | 82.3 |
| Drain weight (g) | 86.4 | 87.3 |
| Weight diff (%) | 5.4 | 6.0 |

FIG. 3

|  | Control | Treatment Tuna flake With Tuna bone powder 1.7%w/w |
|---|---|---|
| Sensory quality | Typical tuna flake in soya oil texture | Texture of tuna flake have more moist and firm comparing to control |

FIG. 4

|  | Control | Tuna flake with tuna bone powder 1.5%w/w | Tuna flake with Tuna bone powder 1.7%w/w | Tuna flake with tuna bone powder 2%w/w |
|---|---|---|---|---|
| Calcium content of flake after drained (mg/100g) | 5.50 | 227.30 | 200.62 | 411.8 |
| Phosphorus content of flake after drained (mg/100g) | 149.32 | 270.42 | 248.90 | 361.3 |

FIG. 5

|  | Control | Treatment with Di-calcium phosphate 1.7%w/w |
|---|---|---|
| Calcium content of flake after drained (mg/100g) | 5.27 | 208.45 |
| Phosphorus content of flake after drained (mg/100g) | 140.71 | 323.44 |

FIG. 6

|  | Control | Treatment with tuna bone powder 1.7%w/w |
|---|---|---|
| Calcium content of flake after drained (mg/100g) | 5.27 | 301.45 |
| Phosphorus content of flake after drained (mg/100g) | 140.71 | 372.54 |

FIG. 7

CALCIUM ENRICHED SEAFOOD PRODUCT

FIELD OF THE INVENTION

The field relates to the food processing science and technology, especially in the field of the production of calcium enriched seafood product, preferably the enrichment of shelf stable, chilled, or frozen fish product with calcium.

DESCRIPTION OF THE RELATED ART

Calcium is the fifth most abundant element in the human body. It plays an important role in many physiological processes, including nerve and muscle functions. Furthermore, calcium is required for a normal growth and the development and maintenance of the skeleton which provides strength and structure of the body.

Over 99% of total body calcium is found in the teeth and bones. As bone contains a high proportion of the body calcium, it is the major reservoir for calcium in most vertebrates and the main component of bone calcium is hydroxyapatite.

Typically, tuna product, especially canned tuna, contains only meat without bone. This causes the low calcium content per can of the products. Other shelf stable tuna products in the market also contain very low quantity of calcium. The enrichment of calcium in food products such as functional beverages with fish bone extract (CN103719990A), fish bean curd supplemented with calcium lactate (CN101032311A), fish ball with addition of fish bone paste (CN102551108), fish meat blend sausage or sausage with addition of bone powders obtained from fish (CN102078004), beef or pork bones, seafood soup with supplementation of ground fish bone (CN104041869) and yogurt with fishbone supplement (CN104041586A) have been reported previously. Nonetheless, other seafood products, especially tuna, products with calcium enrichment have never been reported so far.

Larden et al (2000) reported that the intake of whole small fish with bone can increase calcium bioavailability and the small fishes may be an important source of calcium.

Tuna bone, similar to any other animal bones, is a good source of natural calcium, mainly composed of calcium and phosphate in the form of hydroxyapatite $Ca_{10}(PO_4)_6(OH)_2$ crystal and other ions. The organic phase of the bone is composed of collagen fibers, and ground substances formed by glycoproteins and proteoglycans (Prentice et al. 2003). This makes tuna bone and the partial composition thereof the preferred sources of natural calcium used for the addition or enrichment in the seafood products.

This invention is intended to improve nutritional values, properties and characteristics of shelf stable tuna or salmon products or other similar shelf stable, chilled or frozen fish products by adding fishbone powder such as ground tuna bone, tuna bone powder or the partial composition thereof to tuna or salmon products or other similar shelf stable, chilled or frozen fish products. The said tuna or salmon products or other similar shelf stable, chilled or frozen fish products with added tuna bone or the partial composition thereof are known as calcium enriched products which can provide the health benefits to the consumers similar to or superior to the consumption of whole tuna (meat with bone) products.

This invention, therefore, yields calcium enriched seafood products, including the categories of shelf stable, chilled or frozen tuna or salmon products or other similar shelf stable that can provide bone health benefit to consumers. Typically, the calcium enriched products are designed to provide at least 10% of RDI by adding calcium derived from tuna bone.

SUMMARY OF THE INVENTION

This invention relates to the calcium enriched seafood products, including but not limited to the tuna or salmon flake, tuna or salmon chunk, tuna or salmon shred, tuna or salmon steak or tuna meat or salmon meat in other forms which are preserved in different media such as brine, vegetable oil, spring water or savory gravy; tuna or salmon spread or other similar products made from tuna meat or salmon meat. The shelf stable according to this invention also includes the similar shelf stable made from other fishes. The sources of calcium used for addition or enrichment in said shelf stable can be selected from the raw or partially purified animal or fish bones or inorganic calcium compounds. The preferred animal bones included chicken, swine or beef bones. The preferred fish bones include but not limited to tuna, salmon or trout bones. Furthermore, the said bones may be purified or partially purified in order to remove other bone components except for calcium. In this invention, the calcium obtained from tuna bone is referred to as "tuna calcium" or micronized particle tuna bone powder.

BRIEF DESCRIPTION OF THE DRAWING

Specific implementations of the invention will now be described with reference to the following figures, which are provided by way of example, and not limitation.

FIG. 1 is showing the result of fill weight and drain weight after sterilization of canned tuna flake in brine;

FIG. 2 is showing the sensory property of calcium enriched canned tuna flake in brine;

FIG. 3 is showing the result of drained weight after sterilize and calcium content of canned tuna flake in soya oil;

FIG. 4 is showing the sensory properties of canned tuna flake in soya oil;

FIG. 5 is showing calcium content of canned tuna flake in brine with different amount of tuna bone powder;

FIG. 6 is showing calcium content of canned tuna flake in brine with added Di-calcium phosphate; and FIG. 7 is showing calcium content of canned tuna flake in soya oil with added tuna bone powder.

DETAILED DESCRIPTION OF THE INVENTION

Shelf stable seafood products include the seafood products that can be safely stored at a room temperature in any form of sealed containers such as can, pouch or plastic cup. The preferred examples of the shelf stable seafood products according to this invention are tuna or salmon in can, retort pouch or plastic cup.

Chilled seafood products according to this invention mean the seafood products that need to be stored at refrigerated temperatures (at or below 0-4° C.) in order to maintain the product quality and microbiological safety at the point of consumption. The preferred examples of the chilled seafood products are tuna steak or fillet; salmon steak or fillet.

Frozen seafood products according to this invention means the seafood products that are preserved by freezing and need to be stored at the temperature below −18° C. in order to maintain the highest product quality and microbiological safety. The preferred examples of the frozen seafood products are precooked tuna loin or flake; frozen salmon fillet.

The calcium enriched seafood products according to this invention include but not limited to the shelf stable products, chilled products, and frozen products in the forms of flake, chunk, shred, steak, and spread. The said products are preserved in different media such as brine, vegetable oil, spring water and savory gravy. The said products are made from tuna meat and salmon meat. The shelf stable product according to this invention also includes the similar products made from other fishes. The sources of calcium used for addition or enrichment in said shelf stable product can be selected from the raw or partially purified animal or fish bones or inorganic calcium compounds. The preferred animal bones included chicken, swine or beef bones. The preferred fish bones include but not limited to tuna, salmon or trout bones. Furthermore, the said bones may be purified or partially purified in order to remove other bone components except for calcium. In this invention, the calcium obtained from tuna bone is referred to as "tuna calcium" or micronized particle tuna bone powder.

Other sources of calcium used for addition or enrichment in said products according to this invention can be selected from the group of inorganic calcium compounds such as calcium carbonate, calcium phosphate, calcium sulfate and calcium chloride or combination thereof.

The seafood products according to this invention, preferably tuna or salmon products, exhibits improved qualities, including, but not limited to texture and water holding capacity. The examples below provide example experiments which the selected tuna products are enriched with certain forms of calcium and it is not meant to be the limitation of this invention. Any person with skills in the art should realize that shelf stable according to this invention can be made from other fishes.

Experiment 1:

This experiment shows the effect of calcium enriched tuna flake in brine and soya oil in aspect of product characteristic and nutritional value.

Preparation and testing of canned tuna sandwich (flake) in brine or soya oil media with calcium enrichment. In order to prepare the canned tuna sandwich in brine or soya oil media with calcium enrichment, the detailed process is listed below;

Method:

Mixing precooked skipjack tuna flake having size ranging from 1-2 cm with a tuna calcium particle size of less than 100 microns (micrometers) or in the range of 0.1-30 microns, but most preferably at 10 micron, and a calcium phosphate. The final content of calcium in the finished product is in the range of 0.5-5% (w/w), but most preferably in the range of 1-2% (w/w) of the total weight of said products; and Packing said calcium enriched tuna product obtained from the previous step in a can before sterilizing with a retort process. The said product was examined for fill weight and drain weight and the weight difference (%) was calculated as shown in FIG. 1. The calcium content of the finished product was analyzed by ICP emission spectrometry AOAC (2012), 984.27.

The appearances and sensory evaluation of tuna products after calcium enrichment with 1.5 and 1.7% (w/w) tuna bone powder and 1.7% of di-calcium phosphate are examined with the comparison of the control as shown in FIG. 2.

According to this experiment, the calcium enrichment in tuna products results in the increase of product yield after sterilization in both fill media (i.e., brine and oil) of 6-7.5% (w/w) of the total weight of the product as shown in FIGS. 1 and 3. The sensory qualities of calcium enriched canned tuna flake have been improved especially for moisture and firmness of the product when compared to the control. With micronized particle size, the sandy or chalky texture cannot detect in the product. The effect of amount of tuna bone added on the calcium content of the final products is shown in FIG. 5. The calcium content of the final products after added with di-calcium phosphate is shown in FIG. 6. From this experiment, it is clearly indicated that the calcium content of the canned tuna products both in brine and soya oil were increased significantly after enriched with tuna bone powder or inorganic calcium (FIGS. 6 and 7). The calcium enrichment of tuna product by adding tuna bone powder in the amount of 1.5-2.0% (w/w) of the total product yields high calcium content in the said tuna products after drained (FIG. 5). Namely, the calcium enrichment of tuna product containing the available calcium in the approximate range of 150-412 mg/100 g. This suggests that the calcium enrichment either by adding tuna bone powder or inorganic calcium is highly suitable for making calcium enriched fish products, especially, tuna products which are unprecedented.

It is important to note that the target calcium content per 100 g of product in the selected countries is listed below.

Target Calcium content per 100 g product:

EU: 120-300 mg/100 g

TH: 120-300 mg/100 g

USA: 185-300 mg/100 g

Additionally, the Thai Recommend Daily Intake; Codex Nutrient Reference Value and the US Recommended Daily Intake are 800 mg, 800 mg, and 100 mg, respectively.

The invention claimed is:

1. A calcium enriched fish product, consisting of:
a fish meat containing a calcium supplement,
wherein the fish meat is in the form of flake, shred, chunk or steak, the calcium supplement consists of a fish bone powder having a particle size in the range between 1 micron and 100 microns or an inorganic calcium compound, and an amount of the calcium supplement in the calcium enriched fish product is in the range of 0.5 to 5.0% (w/w) of a total weight of the calcium enriched fish product.

2. The calcium enriched fish product according to claim 1, wherein said calcium enriched fish product is a shelf stable product, a chilled fish product stored at 0-4° C. or a frozen fish product.

3. The calcium enriched fish product according to claim 1, wherein a source of the fish bone powder is a raw or partially purified fish bone.

4. The calcium enriched fish product according to claim 3, wherein the raw or partially purified fish bone is derived from marine or freshwater fishes.

5. The calcium enriched fish product according to claim 4, wherein the raw or partially purified fish bone is derived from salmon or tuna.

6. The calcium enriched fish product according to claim 4, wherein the raw or partially purified fish bone is derived from tuna.

7. The calcium enriched fish product according to claim 1, wherein the inorganic calcium compound is selected from the group consisting of calcium carbonate, calcium phosphate, calcium sulfate, calcium chloride and combinations thereof.

8. The calcium enriched fish product according to claim 1, wherein said product has improved qualities including taste, texture and water holding capacity compared to a non-calcium enriched fish product.

9. The calcium enriched fish product according to claim 1, wherein said product has a weight increase in the range of 6 to 7.5% (w/w) of the total weight of the product after calcium enrichment.

10. The calcium enriched fish product according to claim 1, wherein said product is prepared from the tuna selected from tuna species including Skip Jack, Yellow fin, Albacore and Big eye.

11. The calcium enriched fish product according to claim 1, wherein said product is packed in packaging containers selected from the group consisting of cans, pouches and plastic cups.

12. The calcium enriched fish product according to claim 1, wherein the fish bone powder has a particle size in the range of between 1 micron and 30 microns.

13. The calcium enriched fish product according to claim 1, wherein the fish bone powder has a particle size of 10 microns.

14. The calcium enriched fish product according to claim 1, wherein a phosphorus content in the calcium enriched fish product having 2% (w/w) of the calcium supplement is 361.3 mg/100 g based on a drained weight of the calcium enriched fish product.

15. The calcium enriched fish product according to claim 1, wherein the fish bone powder is selected from the group consisting of tuna bone powder, salmon bone powder and trout bone powder.

16. The calcium enriched fish product according to claim 1, wherein the product is a packaged product.

17. A calcium enriched fish product, consisting of:
a fish meat in the form of flake, shred, chunk or steak; and
a calcium supplement consisting of a fish bone powder;
wherein an amount of the calcium supplement in the calcium enriched fish product is in the range of 1.5 to 2.0% (w/w) of a total weight of the calcium enriched fish product, and an amount of calcium in the calcium enriched fish product is in the range of 150 to 412 mg/100 g of the calcium enriched fish product based on a drained weight of the calcium enriched fish product, wherein the fish bone powder is selected from the group consisting of tuna bone powder, salmon bone powder and trout bone powder.

18. The calcium enriched fish product according to claim 17, wherein the fish bone powder has a particle size in the range between 1 micron and 100 microns.

\* \* \* \* \*